(12) United States Patent
Yarosh et al.

(10) Patent No.: US 10,572,068 B2
(45) Date of Patent: Feb. 25, 2020

(54) UNIFORMITY CORRECTION METHOD FOR LOW COST AND NON-RECTANGULAR TOUCH SENSOR MATRICES

(71) Applicant: Cypress Semiconductor Corporation, San Jose, CA (US)

(72) Inventors: Andriy Yarosh, Moguliv-Podissky (UA); Jens Weber, Munich (DE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/224,295

(22) Filed: Dec. 18, 2018

(65) Prior Publication Data
US 2019/0196653 A1 Jun. 27, 2019

Related U.S. Application Data

(63) Continuation of application No. 15/875,935, filed on Jan. 19, 2018, now Pat. No. 10,185,444, which is a continuation of application No. 15/710,488, filed on Sep. 20, 2017, now Pat. No. 9,910,544.

(60) Provisional application No. 62/434,003, filed on Dec. 14, 2016.

(51) Int. Cl.
| G06F 3/045 | (2006.01) |
| G06F 3/041 | (2006.01) |
| G06F 3/044 | (2006.01) |
| G06F 3/043 | (2006.01) |
| G06F 3/042 | (2006.01) |

(52) U.S. Cl.
CPC ............ *G06F 3/0418* (2013.01); *G06F 3/042* (2013.01); *G06F 3/043* (2013.01); *G06F 3/044* (2013.01); *G06F 3/045* (2013.01)

(58) Field of Classification Search
CPC ........ G06F 3/0418; G06F 3/045; G06F 3/042; G06F 3/043; G06F 3/044
See application file for complete search history.

(56) References Cited

U.S. PATENT DOCUMENTS

| 7,265,686 | B2 | 9/2007 | Hurst et al. |
| 8,159,644 | B2 | 4/2012 | Takatori |
| 9,105,255 | B2 | 8/2015 | Brown et al. |
| 9,519,391 | B2 | 12/2016 | Peterson et al. |
| 9,910,544 | B1 | 3/2018 | Yarosh et al. |
| 10,185,444 | B2 | 1/2019 | Yarosh et al. |
| 2008/0093130 | A1 | 4/2008 | Lee et al. |
| 2010/0097355 | A1 | 4/2010 | Jang et al. |

(Continued)

FOREIGN PATENT DOCUMENTS

| CN | 101165644 A | 4/2008 |
| WO | 2017035998 A1 | 3/2017 |

OTHER PUBLICATIONS

International Search Report for International Application No. PCT/US17/52896 dated Dec. 5, 2017; 2 pages.

(Continued)

*Primary Examiner* — Rodney Amadiz

(57) ABSTRACT

Systems and methods access a correction value in a correction matrix. The correction matrix defines an active region of a touch array that includes plurality of unit cells. The correction value corresponds to a unit cell of the plurality of unit cells. Systems and methods modify a touch sense value of the unit cell using the correction value, based on the unit cell being partially within the active region. Systems and methods detect an object using the touch array, based on the modified sense value.

19 Claims, 9 Drawing Sheets

(56) References Cited

U.S. PATENT DOCUMENTS

| | | |
|---|---|---|
| 2013/0088457 A1 | 4/2013 | Tu et al. |
| 2014/0210792 A1 | 7/2014 | Drumm |
| 2014/0307185 A1 | 10/2014 | Wijaya et al. |
| 2015/0241194 A1 | 8/2015 | Nakagawa et al. |
| 2016/0048246 A1 | 2/2016 | Park |
| 2016/0239131 A1 | 8/2016 | Kang |
| 2016/0240141 A1 | 8/2016 | Lee et al. |
| 2016/0246423 A1 | 8/2016 | Fu |
| 2016/0291737 A1 | 10/2016 | Hirakawa |
| 2016/0349558 A1 | 12/2016 | Shishido et al. |
| 2017/0123572 A1 | 5/2017 | Song et al. |
| 2017/0235395 A1 | 8/2017 | Long et al. |

OTHER PUBLICATIONS

USPTO Non-Final Rejection for U.S. Appl. No. 15/875,935 dated May 17, 2018; 7 pages.
USPTO Notice of Allowance for U.S. Appl. No. 15/710,488 dated Dec. 18, 2017; 8 pages.
USPTO Notice of Allowance for U.S. Appl. No. 15/875,935 dated Oct. 3, 2018; 9 pages.
Written Opinion of the International Searching Authority for International Application No. PCT/US17/52896 dated Dec. 5, 2017; 6 pages.
SIPO Office Action for Application No. 201780056937.2 dated Oct. 9, 2019; 9 pages.
Japanese Office Action for international patent application No. 2019-517343 dated Nov. 26, 2019, 3 pages.

UNIFORMITY CORRECTION METHOD FOR LOW COST AND NON-RECTANGULAR TOUCH SENSOR MATRICES

RELATED APPLICATIONS

This application is a continuation of U.S. patent application Ser. No. 15/875,935 filed on Jan. 19, 2018, which claims the benefit of U.S. patent application Ser. No. 15/710,488 filed on Sep. 20, 2017, which claims the benefit of U.S. Provisional Patent Application No. 62/434,003, filed on Dec. 14, 2016, all of which are incorporated herein in their entirety.

TECHNICAL FIELD

This disclosure relates to the field of user interface devices and, in particular, to sensing devices.

BACKGROUND

Touch arrays may be used to replace mechanical buttons, knobs, and other similar mechanical user interface controls, providing reliable operation under harsh conditions. Touch arrays for a touch panel (e.g., a touch-sensing surface) are widely used in modern customer applications, providing new user interface options in existing products. A touch controller may receive signals from a touch array. The signals may correspond to values (e.g., capacitance values, resistance values, touch sense values, etc.). For example, when no objects are in contact or in close proximity with the touch panel, the touch controller may receive a signal corresponding to a baseline value of the touch array. When an object, such as a finger, comes in contact or close proximity with the touch panel, the touch controller may receive a signal corresponding to a second value (e.g., capacitance value, a resistance value, touch sense value, etc.) that is different from the baseline value of the touch array. The touch controller may convert the signals into digital values (e.g., the touch controller may process and digitalize the signals to generate measurement values) that are stored as measurement values in the memory of an electronic device. Conventional touch controllers can process signals received from rectangular touch arrays by using standard firmware (e.g., universal configurable firmware). Conventional touch controllers cannot process signals received from non-rectangular touch arrays using universal configurable firmware.

BRIEF DESCRIPTION OF THE DRAWINGS

The present invention is illustrated by way of example, and not of limitation, in the figures of the accompanying drawings in which.

DETAILED DESCRIPTION

Figure 1A:
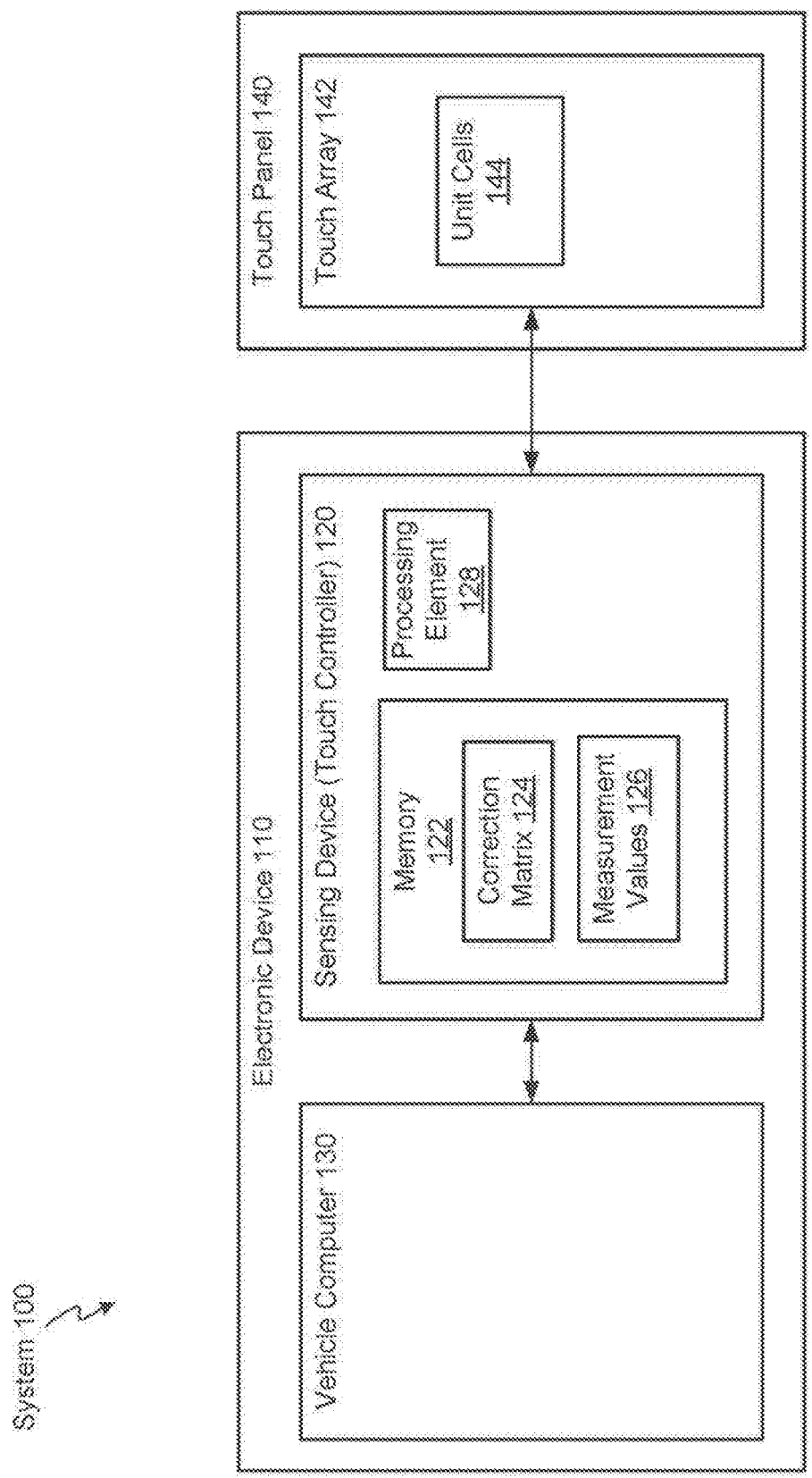
FIG. 1A is a block diagram illustrating an exemplary system having a correction matrix for modifying values corresponding to unit cells of a touch array of a touch panel according to one embodiment.

The technology described herein is directed to modifying values corresponding to unit cells of a touch array where the touch array is non-rectangular such as trapezoidal, circular, free-form, complex shape, and hole-containing touch arrays. A touch controller measures values on a touch array of a touch panel and the touch controller processes the measured values for use in an electronic device. Conventional touch controllers use standard firmware (e.g., universal configurable firmware) that has a rectangular data organization to process measured values corresponding to rectangular touch arrays (e.g., touch arrays that correspond to rectangular touch panels). Conventionally, touch controllers cannot use the standard firmware to process non-rectangular touch arrays (e.g., touch arrays that correspond to non-rectangular touch panels, such as circular panels, free-form panels, and hole-containing touch panels). Conventional touch controllers cannot recognize active regions of non-rectangular touch arrays, cannot correct measured values for edges of non-rectangular touch arrays, and cannot account for holes in non-rectangular touch arrays.

The embodiments described herein may address the above and other deficiencies by providing a correction matrix to define an active region of the touch array and by modifying values corresponding to unit cells that are not completely within the active region as defined in the correction matrix. A touch controller may have a memory and a processing element. The memory may store values corresponding to unit cells of a touch array and may store a correction matrix that defines an active region and an inactive region of the touch array. The processing element may modify values of a subset of the unit cells that are not completely within the active region. By using the correction matrix, the touch controller may recognize active regions of a non-rectangular touch array, the touch controller may correct measured values for edges of a non-rectangular touch array, and the touch controller may account for holes in a non-rectangular touch array (e.g., one or more cavities or openings from an upper surface of the touch array to a lower surface of the touch array). Modifying values corresponding to unit cells that are not completely within an active region using the correction matrix may provide a more accurate representation of contact by an object with the touch panel. Embodiments of the correction matrix may improve edge accuracy of the touch array.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

FIG. 1A is a block diagram illustrating an exemplary system 100 having a correction matrix 124 for modifying measurement values 126 (e.g., touch sense values) corresponding to a measured characteristic of unit cells 144 of a touch array 142 (e.g., a non-rectangular touch array) of a touch panel 140, according to one embodiment. The system 100 includes an electronic device 110 and a touch panel 140. In one embodiment, the electronic device 110 is external to the touch panel 140. In another embodiment, the electronic device 110 is integral to the touch panel 140. The electronic device 110 may be any type of device that includes a touch panel 140, is connected to a touch panel 140, or is otherwise operating with a touch panel 140. The electronic device 110 may be a personal computer, a tablet computer, a mobile device such as cellular phones, media consumption devices, GPS devices, watches, computer, or any specific-purpose computer, such as a vehicle computer, a navigation system in a vehicle, or a media system in a vehicle. The touch panel 140 may include a touch array 142. The touch array 142 may include unit cells 144. The electronic device 110 may include a sensing device 120 (e.g., touch controller). The sensing device 120 may include memory 122 and processing element 128. The memory 122 may store a correction matrix 124 and measurement values 126. The electronic device 110 may include additional components, such as a vehicle computer 130. The sensing device 120 may be coupled to the touch array 142 and may be coupled to additional components, such as a vehicle computer 130. In one embodiment, the sensing device 120 and the additional components are external to each other. In another embodiment, the sensing device and one or more of the additional components (e.g., the vehicle computer 130) are integral to each other.

Figure 1B:
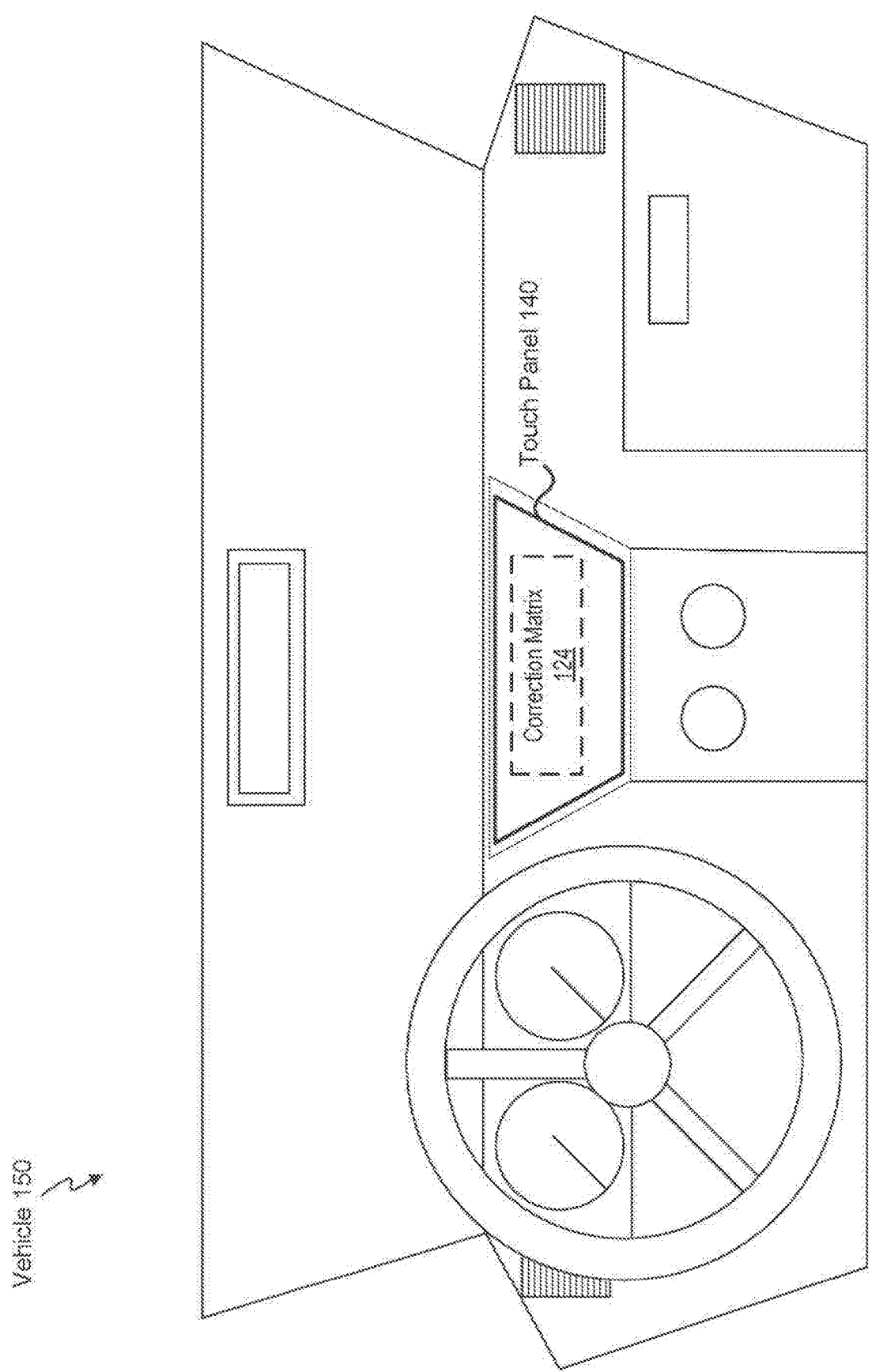
FIG. 1B illustrates a vehicle including a touch panel and a correction matrix for modifying values corresponding to unit cells of the touch panel, according to one embodiment.

FIG. 1B illustrates a vehicle 150 including a touch panel 140 and a correction matrix 124 for modifying measurement values 126 (e.g., touch sense values) corresponding to a measured characteristic (e.g., capacitance, resistance, inductance, etc.) of unit cells 144 of the touch panel 140, according to one embodiment. The touch panel 140 may be installed in vehicle 150. The touch panel 140 may display information and may receive user input. The shape of the touch panel 140 may be based on the design of the vehicle 150. The touch panel 140 may be non-rectangular. For example, the touch panel 140 may have a circular shape, a trapezoidal shape, be a free-from, or be hole-containing. The touch array 142 may have a shape that corresponds to the shape of the touch panel 140 (e.g., the touch array 142 and the touch panel 140 may have substantially the same non-rectangular shape). A sensing device 120 corresponding to the touch array 142 may be a rectangular-organized touch controller (e.g., may have universal configurable firmware). The sensing device 120 may use the correction matrix to define an active region and may modify values of a subset of the unit cells that are not completely within the active region.

Returning to FIG. 1A, processing element 128 may receive signals from the touch array 142. The processing element 128 may digitalize the signals to generate measurement values 126. The measurement values 126 may include touch sense values corresponding to a measured characteristic of at least one unit cell of the unit cells 144 of a non-rectangular touch array 142). A touch sense value may correspond to a measured characteristic indicating whether an object is proximate to the touch panel 140 (e.g., touching the touch panel 140, hovering over the touch panel 140, etc.). In one embodiment, the touch sense value corresponds to a measured characteristic indicating the proximity of an object to a touch panel 140 (e.g., how close an object is to touching the touch panel 140, the distance between an object and the touch panel 140). In one embodiment, the touch sense value corresponds to a measured characteristic indicating pressure of an object on the touch panel 140.

The processing element 128 may be coupled to memory 122 and may store the measurement values 126 in the memory 122. A first set of measurement values (e.g., baseline values) may correspond to a state of the touch array 142 without any objects being in contact with the touch panel 140. A second set of measurement values may correspond to signals received by the sensing device 120 from a touch array 142 in response to an object being in contact with respective portions of the touch panel 140. The measurement values 126 may correspond to a change in value (e.g., capacitance value, resistance value, etc.) in the touch array 142. Memory 122 may also store a correction matrix 124 that defines an active region and an inactive region of the touch array 142. Processing element 128 may modify (e.g., using the correction matrix 124) measurement values 126 corresponding to unit cells 144 that are not completely within the active region defined by correction values of the correction matrix 124.

In one embodiment, the sensing device 120 is a resistance-sensing device, the touch array 142 is a resistance touch array (e.g., resistance sensor array), and the touch array 142 measures change in resistance. In another embodiment, the sensing device 120 is an inductance-sensing device, the touch array 142 is an inductance touch array (e.g., inductance sensor array), and the touch array 142 measures change in inductance. In another embodiment, the sensing device 120 is an infrared-sensing device, the touch array 142 is an infrared touch array (e.g., infrared sensor array), and the touch array 142 measures change in infrared light. In another embodiment, the sensing device 120 is an optical-sensing device, the touch array 142 is an optical touch array (e.g., optical sensor array), and the touch array 142 measures change in visible light (e.g., wavelengths in the visible spectrum, wavelengths in the optical window). In another embodiment, the sensing device 120 is an acoustic-sensing device, the touch array 142 is an acoustic touch array (e.g., acoustic sensor array), and the touch array 142 measures change in ultrasonic waves. In another embodiment, the sensing device 120 is a microelectromechanical system (MEMS)-sensing device, the touch array 142 is a MEMS touch array (e.g., MEMS sensor array), and the touch array 142 measures compression. In another embodiment, the sensing device 120 is a force-sensing device, the touch array 142 is a force touch array (e.g., force sensor array), and the touch array 142 converts an input mechanical force into an electrical output signal. In another embodiment, sensing device 120 is a capacitance-sensing device, the touch array 142 is a capacitance touch array (e.g., capacitance sensor array), and the touch array 142 measures change in capacitance (see FIGS. 2A-B).

Figure 2A:
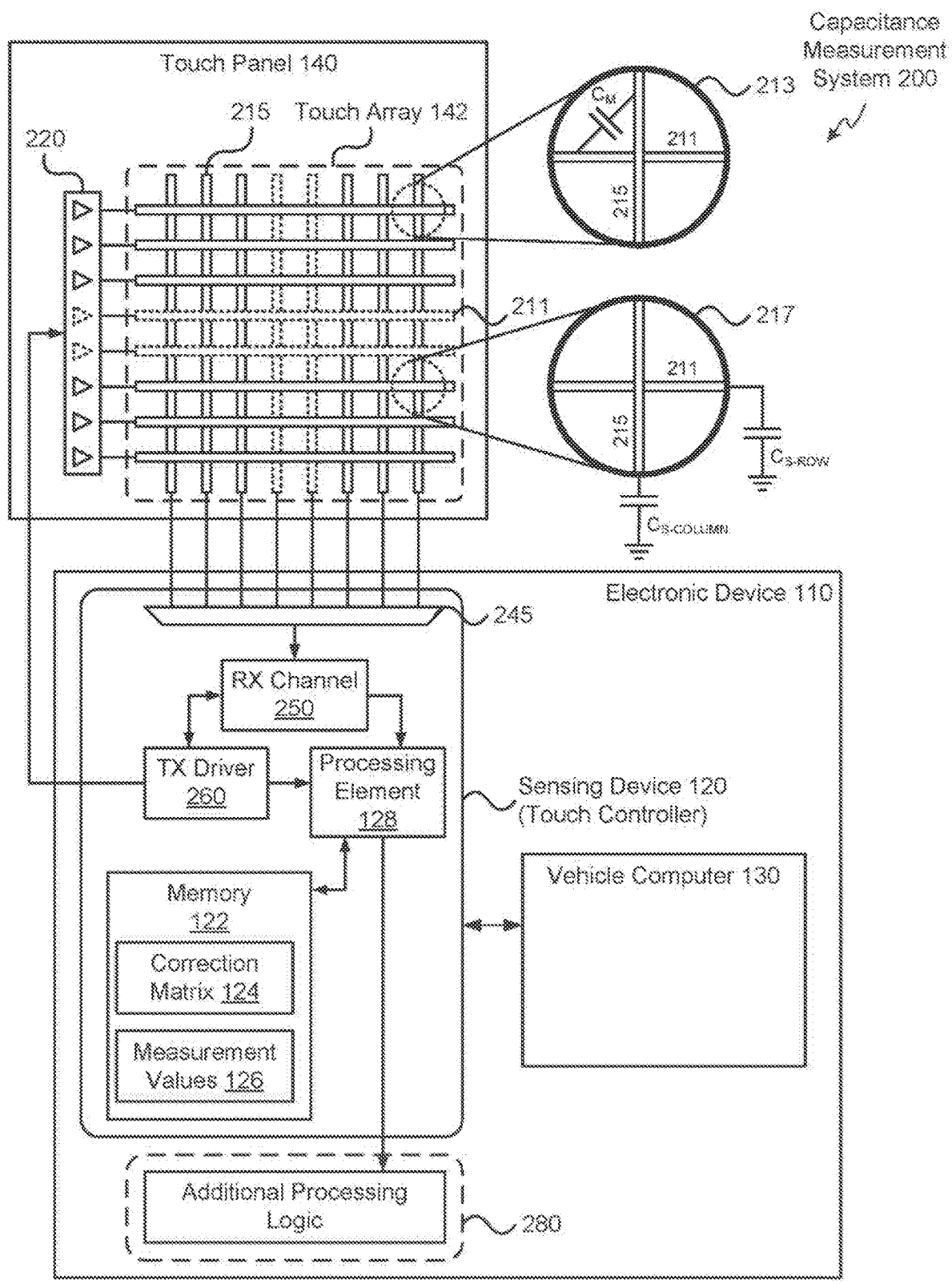
FIG. 2A illustrates a capacitance measurement system with a correction matrix for modifying values corresponding to unit cells of a touch array, according to one embodiment.

FIG. 2A illustrates a capacitance measurement system 200 with a correction matrix 124 for modifying measurement values 126 corresponding to touch array 142, according to one embodiment. Capacitance measurement system 200 includes a touch panel 140 and an electronic device 110. The touch panel 140 includes a touch array 142 and the electronic device 110 includes a sensing device 120 (e.g., a capacitance measurement circuit, a touch controller). Touch array 142 may include a plurality of row electrodes 211 and a plurality of column electrodes 215. In the embodiment of FIG. 2A, there are eight row electrodes 211 and eight column electrodes 215, however one of ordinary skill in the art would understand that more or fewer than eight electrodes on each axis may be used. Similarly, while the same number of row electrodes 211 and column electrodes 215 are shown, in various embodiments, the number of row electrodes and the number of column electrodes may be different. In various embodiments, the touch array 142 is non-rectangular.

Figure 4B:
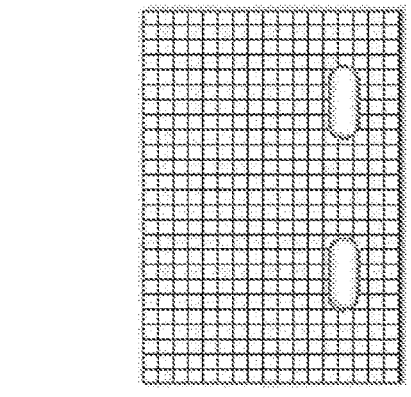
FIGS. 4A-D illustrate exemplary non-rectangular touch arrays according to various embodiments.
Figure 4D:
Figure 4A:
Figure 4C:
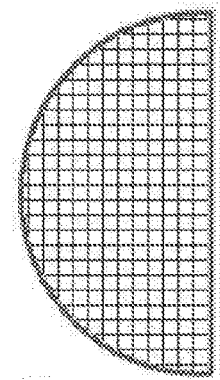

In one embodiment, the touch array 142 may have opposing sides that are not parallel to each other (e.g., the outermost row electrodes 211 are not parallel, the outermost column electrodes 215 are not parallel). The non-rectangular touch array 142 may include row sensing elements (e.g., row electrodes 211) and column sensing elements (e.g., column electrodes). Each of the row sensing elements may be disposed about a corresponding row axis that is parallel with a first axis. Each of the column sensing elements may be disposed about a corresponding column axis that is parallel with a second axis. Each of the unit cells 144 may be defined by an intersection of a corresponding row sensing element of the row sensing elements and a corresponding column sensing element of the column sensing elements. The active region (e.g., see active region 510 in FIG. 5) may be defined by the row sensing elements and the column sensing elements. One or more edges of the active region of the non-rectangular touch array 142 may not be parallel with the first axis and the second axis. In one example, the touch array may be a trapezoid (e.g., see touch array 400b in FIG. 4B). In another example, touch array has a rounded side (e.g., is a semicircle, see touch array 400c in FIG. 4C). In another embodiment, touch array 400d has one or more inactive regions (e.g., holes, cavities, one or more openings from an upper surface of the touch array 142 to a lower surface of the touch array 142, unit cells 144 that are turned off, lack of sensing elements, see touch array 400d in FIG. 4D, etc.) that are surrounded or partially surrounded by one or more active regions. The inactive region may be surrounded completely (e.g., a hole) or partially (e.g., a notch or cut-out in the side of an active region) by an active region.

Capacitance measurement system 200 may be configured to measure either mutual capacitance or self-capacitance, depending on application requirements. A mutual capacitance, $C_M$, may be formed at intersections of electrodes of different axes. A mutual capacitance, $C_M$, between a row electrode 211 and a column electrode 215 is shown in cutout 213. Mutual capacitance $C_M$ may be formed by two electrodes disposed adjacent to each other, though not necessarily intersecting. A self-capacitance, $C_S$, of a single electrode may be formed between the electrode and the surrounding circuit elements, including a ground electrode. Self-capacitances, $C_{S\text{-}column}$ and $C_{S\text{-}row}$, are shown for row electrode 211 and column electrode 215, respectively, in cutout 217. For self-capacitance measurement, electrodes may be disposed so that none intersect with each other. In this embodiment, self-capacitance electrodes may be configured as pads or discrete electrodes with a capacitance to ground or other circuit voltage potentials. Self-capacitance electrodes may take the form of circles, ellipses, squares, rectangles, or have any of a variety of other shapes that are optimized for system requirements. In one embodiment, capacitance measurement system 200 may be configured to switch between a mutual capacitance sensing mode and a self-capacitance sensing mode based on application requirements. In still another embodiment, capacitance measurement system 200 may be fixed as either a mutual capacitance measurement system or a self-capacitance measurement system.

Capacitance measurement system 200 may include a sensing device 120 (e.g., capacitance measurement circuit, touch controller) coupled to column electrodes 215. Each of the column electrodes 215 may be coupled to RX channel 250 through an input multiplexer 245. The embodiment illustrated in FIG. 2A is that of a mutual capacitance measurement circuit. In one embodiment, only one electrode of the mutual capacitor formed between a row electrode 211 and a column electrode 215 is coupled to the RX channel 250. In another embodiment, more than one electrode of the mutual capacitor formed between a row electrode 211 and a column electrode 215 is coupled to the RX channel 250. In a self-capacitance measurement circuit, row electrodes 211 may also be coupled to RX channel 250 through a multiplexer similar to input multiplexer 245. A second multiplexer for row electrodes 211 is not shown for clarity of explanation.

When capacitance measurement system 200 is configured to measure mutual capacitance, row electrodes may be coupled to drive buffers 220 for providing a drive signal, TX, to one electrode of a mutual capacitance (shown in detail in cutout 213). The drive buffers 220 may be part of electronic device 110. While only eight drive buffers 220 are shown in FIG. 2A, one or ordinary skill in the art would understand that at least one drive buffer 220 may be used for each electrode to be driven. The signal provided to the drive electrodes may be provided by TX driver 260, which shares a clock source with RX channel 250 to ensure that the drive and receive operations of sensing device 120 (e.g., capacitance measurement circuit 240) are synchronized. Both RX channel 250 and TX driver 260 may be coupled to processing element 128, which may be configured to convert signals received on RX channel to digital values representative of capacitances on touch panel 140 (mutual capacitances, $C_M$, between row electrodes 211 and column electrodes 215 and self-capacitances, $C_S$, between row electrodes and ground and column electrodes and ground). Processing element 128 may be coupled to additional processing logic 280 to complete capacitance measurement, determine presence/absence of a conductive object, or perform other processing functions. In various embodiments, additional processing logic may be implemented on the same integrated circuit as sensing device 120 (e.g., capacitance measurement circuit, touch controller) or it may be implemented on a separate integrated circuit. Additionally, various circuit elements of sensing device 120 (e.g., capacitance measurement circuit) may be implemented on different integrated circuits, although this is not shown in FIG. 2A.

In mutual capacitance sensing, a single axis may be coupled to RX channel 250. While FIG. 2A illustrates that column electrodes 215 are coupled to RX channel 250 and row electrodes 211 are coupled to TX driver 260, one of ordinary skill in the art would understand that this relationship may be switched. In one embodiment, row electrodes 211 may be coupled to RX channel 250 and column electrodes 215 may be coupled to TX driver 260. Additionally, the relationship of row electrodes 211 and column electrodes to the various elements of capacitance measurement circuit 240 need not be static. In one embodiment, the connections of row electrodes 211 and column electrodes 215 may switch during run time, depending on the system requirements.

Processing element 128 may be coupled to memory 122. Memory 122 may store measurement values 126 corresponding to unit cells of the touch array 142. For example, the sensing device 120 may receive one or more signals from the touch array 142 in response to an object coming in contact with the touch panel 140 which causes a change in capacitance in the touch array 142. The processing element 128 may convert the one or more signals into measurement values 126 and store the measurement values 126 in the memory 122. Memory 122 may also store a correction matrix 124 that defines an active region and an inactive region of the touch array 142. Processing element 128 may modify (e.g., using the correction matrix 124) measurement values 126 corresponding to unit cells 144 that are not completely within the active region defined by correction values of the correction matrix 124.

In one embodiment, the sensing device 120 is coupled to a vehicle computer 130. In one embodiment, the additional processing logic 280 includes the vehicle computer 130.

Figure 2B:
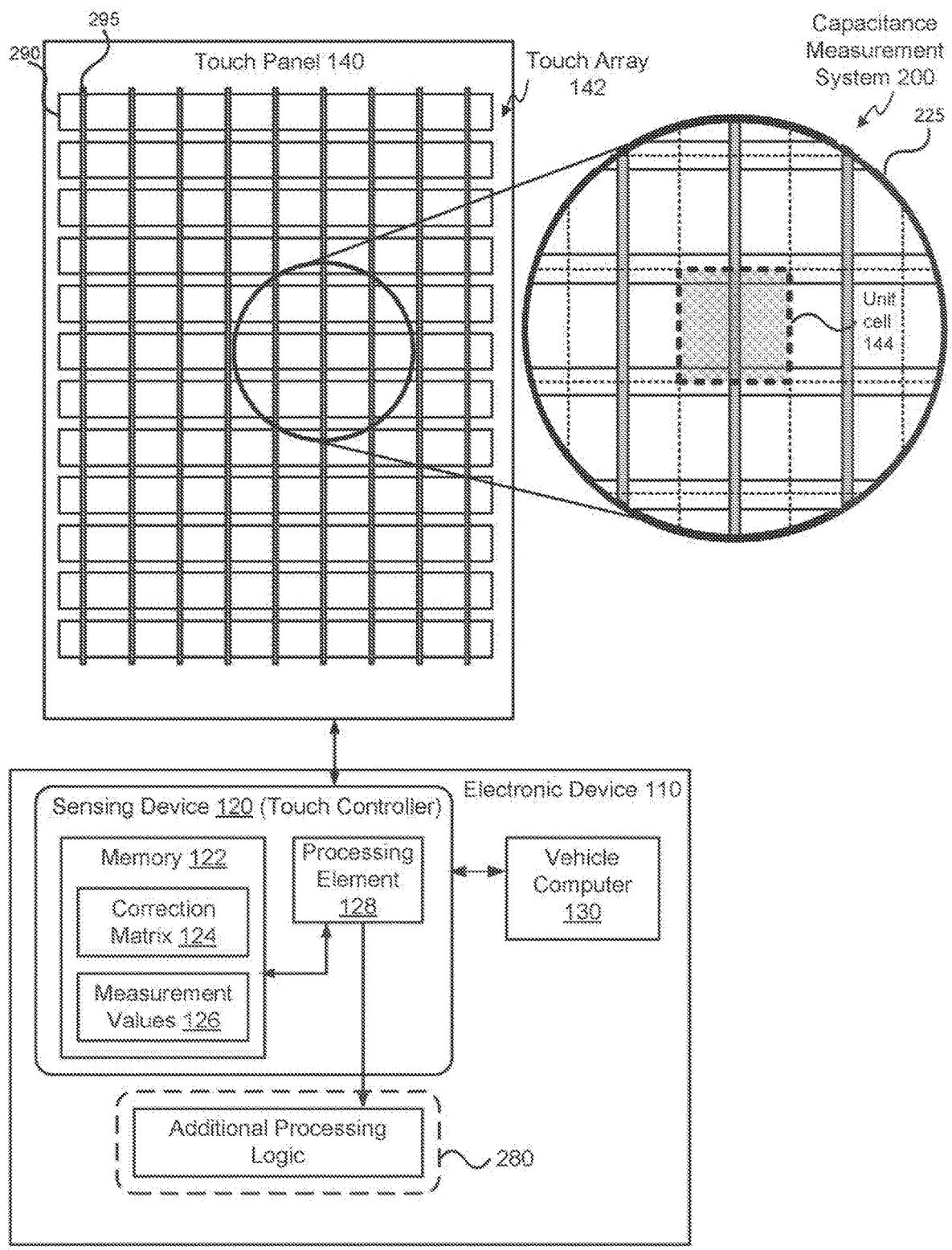
FIG. 2B illustrates a capacitance measurement system with a correction matrix for modifying values corresponding to unit cells of a touch array, according to another embodiment.

FIG. 2B illustrates a capacitance measurement system 200 with a correction matrix 124 for modifying values 126 corresponding to unit cells 144 of a touch array 142, according to another embodiment. The touch array 142 may be an array of electrodes which may be disposed over a display as part of a touch panel 140 (e.g., touchscreen/display). A first plurality of electrodes 290 may be disposed on a substrate (not shown) along a first axis. A second plurality of electrodes 295 may be disposed on a substrate along a second axis. Electrodes 290 and 295 may be bar-shaped in one embodiment. In another embodiment, electrodes 290 and 295 may have more complex structures that are based on the bar-shaped theme. Close-up 225 illustrates the intersection between the first plurality of electrodes 290 and the second plurality of electrodes 295. A mutual capacitance may be formed at the intersection of an electrode from the first plurality of electrodes 290 and an electrode of the second plurality of electrodes 295 and this region of mutual capacitance may be described as a unit cell 144 of the array of electrodes. Unit cells may exist at every intersection and may be used to detect the location of a conductive object.

Unit cells such as unit cell 144 and corresponding measured capacitance values may be used to detect the location of one or more conductive objects on or near a surface (e.g., of touch panel 140) contacted by a user. An array of unit cells may be used to detect one or more conductive objects of various types, including bare fingers, gloved fingers, styli (either active or passive) or an object hover above the surface. Unit cells may be used individually, in combination, or both to determine object and interaction type.

Unit cells such as unit cell 144 may be conceptualized geometrically as the smallest unit of tessellation. That is, the smallest repeatable unit of measurement on the array. Unit cells such as unit cell 144 may also be conceptualized by stating that every point within the unit cell is closer to the center of that unit cell (the center of the intersection between the electrodes on different axes) than it is to the center of any other unit cell. Unit cells such as unit cell 144 may be conceptualized functionally as the native resolution of an array of electrodes, such as electrodes 290 and 295. That is, each row and column may be identified and a position defined on each row and column. For a rectangular array with twelve columns and nine rows, there may be 108 discrete locations. Since unit cell 144 exists between the seventh row (from the top) and the sixth column (from the left) and unit cell 144 exists at the intersection between the sixth row and the sixth column, their positions may be given by 6,7 and 6,6, respectively, based on the native resolution of an array of electrodes, such as electrodes 290 and 295. Unit cells such as unit cell 144 may be conceptualized as pixels of an array, wherein each pixel may be assigned a location and a measurable value specific to that location. Unit cells may also be referred to as "nodes" where each intersection of the row and column electrodes is a node of the array. Unit cells may be referred to merely as intersections in a mutual capacitance sensing array. The term "intersection" is merely shorthand for their construction as an intersection between row and column electrodes.

The touch panel 140 may be coupled to electronic device 110. Electronic device 110 may include sensing device 120, vehicle computer 130, and additional processing logic 280. Processing element 128 may be coupled to memory 122. Memory 122 may store a measurement value 126 corresponding to unit cell 144 of the touch array 142. Memory 122 may also store a correction matrix 124 that defines an active region and an inactive region of the touch array 142. Processing element 128 may modify measurement value 126 corresponding to unit cell 144 that is not completely within the active region defined by correction values of the correction matrix 124.

Although some embodiments described in relation to FIGS. 2A-B correspond to capacitance sensing, the embodiments described in relation to FIGS. 2A-B are applicable to other types of sensing. For example, the touch array 142 may measure one or more of change in resistance, change in infrared light, change in visible light, change in ultrasonic waves, compression, an input mechanical force, or the like.

Figure 3A:
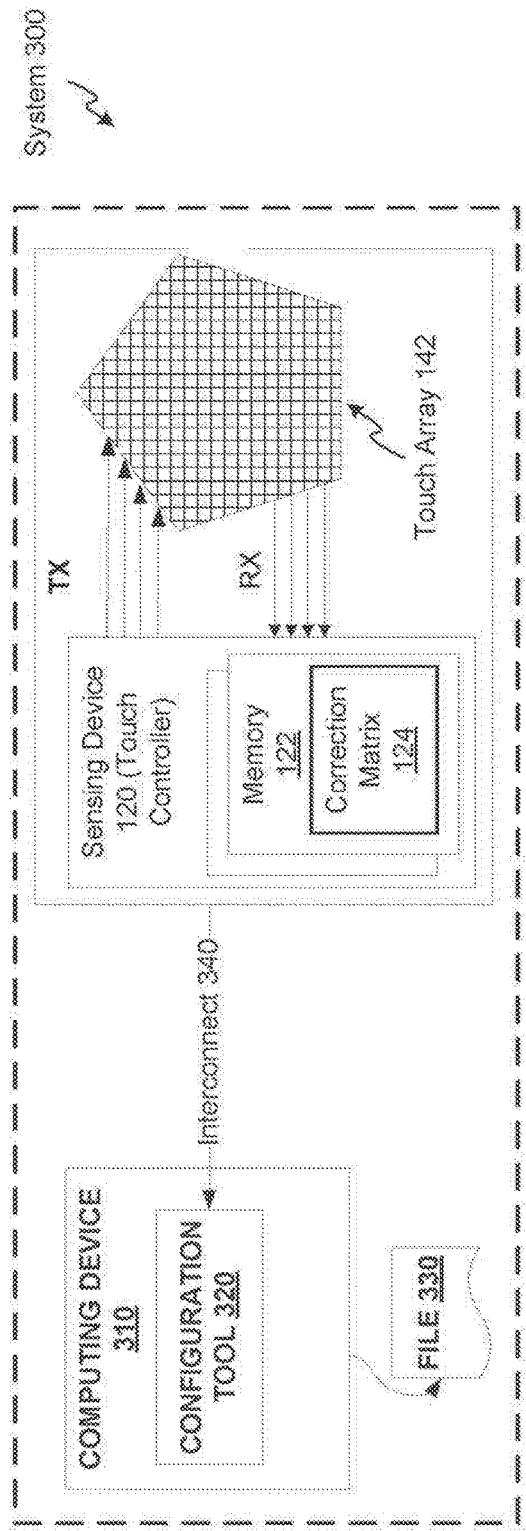
FIG. 3A illustrates a block diagram illustrating an exemplary system having a correction matrix for modifying values corresponding to unit cells of a touch array, according to another embodiment.
Figure 3B:
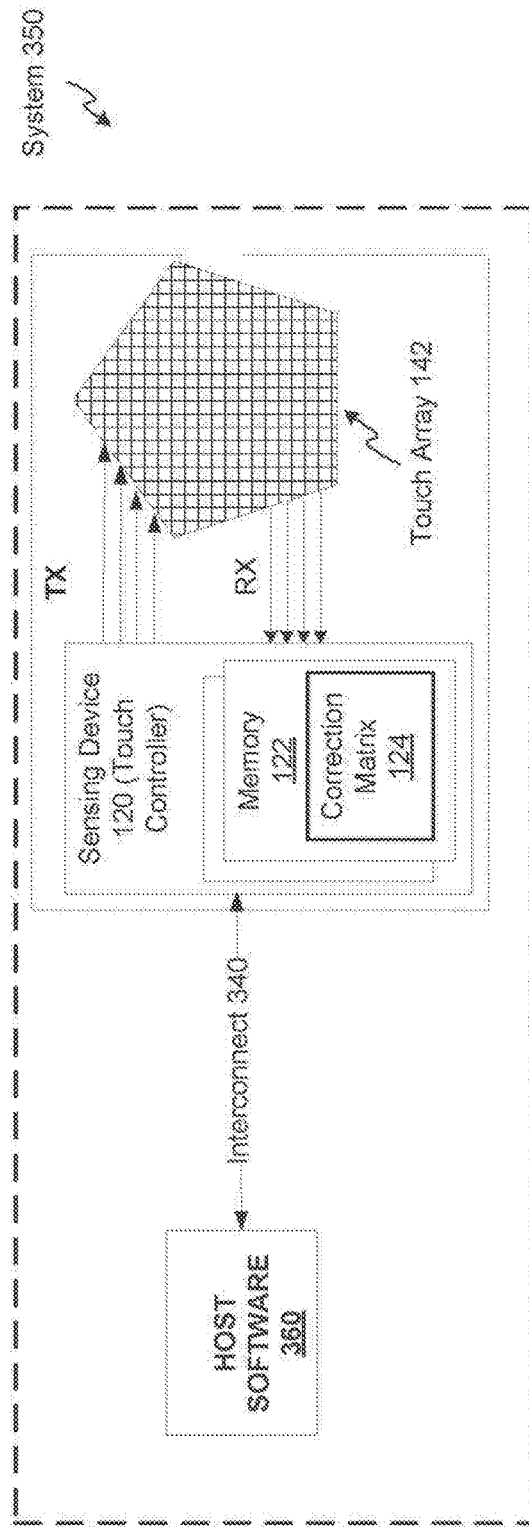
FIG. 3B illustrates a block diagram illustrating an exemplary system having a correction matrix for modifying values corresponding to unit cells of a touch array, according to another embodiment.

FIG. 3A-B illustrate block diagrams illustrating an exemplary systems 300 and 350 having a correction matrix 124 for modifying values 126 corresponding to unit cells 144 of a touch array 142, according to embodiments.

Systems 300 and 350 may include a sensing device 120 (e.g., touch controller) and a touch array 142. In one embodiment, the sensing device 120 may send a TX signal to the touch array 142 (e.g., inducing charge on first electrodes) and the sensing device 120 may measure a resulting RX signal (e.g., received via second electrodes). The sensing device 120 may convert the resulting RX signal into a measurement value 126 and may store the measurement value 126 in memory 122.

In another embodiment, the sensing device 120 may send a TX signal to the touch array 142 (e.g., inducing charge on an electrode) and the sensing device 120 may discharge an electrode by receiving RX signals from the touch array 142. The sensing device 120 may measure the rate of charging and discharging to determine the presence of an object on touch panel 140 that disrupts the rate of charging and discharging. A baseline rate is when an object is not present on the touch array 142 (e.g., a raw count without user touch). The sensing device 120 may determine a change from the baseline rate using digital counts (e.g., counting the number of charges and discharges). When an object is present on or close to the touch panel 140, the sensing device 120 may detect the electrodes charging and discharging at a different rate (e.g., faster or slower than when an object is not present on or is not close to the touch panel 140) so that there is a change in count. In one embodiment, self-capacitance has a higher count when an object is proximate the touch panel 140 than when an object is not proximate the touch panel 140. In one embodiment, mutual capacitance has a lower count when an object is proximate the touch panel 140 than when an object is not proximate the touch panel 140. If the count (e.g., a raw count when an object is proximate the touch panel 140) or a difference between the count and a baseline count (e.g., a count when an object is not proximate the touch panel 140) is above a threshold, the sensing device 120 may determine that an object is proximate the touch panel 140. The sensing device 120 may convert signals (e.g., counts, etc.) into measurement values 126 and may store the measurement values 126 in memory 122.

FIG. 3A illustrates generating a correction matrix 124 and FIG. 3B illustrates using the correction matrix 124. In one implementation, a correction matrix 124 is generated (e.g., a new correction matrix is created, an existing correction matrix is updated) as part of manufacturing of the touch panel 140. In another implementation, a correction matrix 124 is generated as part of testing of the touch panel 140. In another implementation, a correction matrix 124 is generated upon initiating (e.g., turning on, powering-up) the touch panel 140. In another implementation, a correction matrix 124 is generated at intervals. In another implementation, a correction matrix 124 is generated upon switching modes (e.g., switching between a finger-touch mode, a stylus mode, etc.) via the electronic device 110. In another implementation, a correction matrix 124 is generated upon receiving instructions from the electronic device 110 (e.g., sensing device 120, vehicle computer 130). In another implementation, a correction matrix 124 is generated upon receiving instructions from a host computing device. In another implementation, the correction matrix 124 is a constant for a touch panel 140 (e.g., the correction matrix 124 is generated during testing and manufacture for subsequent use as constant values for the touch panel 140).

Referring to FIG. 3A, a computing device 310 (e.g., electronic device 110, vehicle computer 130, a device external to the sensing device 120, etc.) may execute a configuration tool 320. The configuration tool may be touch controller configuration software, such as true touch host emulator (TTHE) software. The computing device 310 may execute the configuration tool 320 to define correction values for the correction matrix 124 (e.g., to generate the correction matrix 124). The computing device 310 may cause the correction matrix 124 to be stored in memory of the sensing device 120 (e.g., memory 122, read-only memory (ROM), a one-time programmable (OTP) memory array, etc.). In one embodiment, the computing device 310 may cause the correction matrix 124 to be stored in a file 330 (e.g., a hex file). File 330 may be a touch application to be used to program sensing devices 120 before production of touch panels 140. After a sensing device 120 is programmed, the file 330 may be stored in memory of the sensing device 120 (e.g., memory 122, read-only memory (ROM), a one-time programmable (OTP) memory array, etc.). The computing device 310 may communicate with the sensing device 120 via an interconnect 340 by using a communication protocol (e.g., integrated circuit protocol (I²C), serial peripheral interface (SPI), etc.).

Referring to FIG. 3B, a system 350 may include a sensing device 120 that includes the correction matrix 124 that was generated by a configuration tool 320 (e.g., see FIG. 3A). The sensing device 120 in FIG. 3B may be the same sensing device 120 described in relation to FIG. 3A or may be a different sensing device 120. The sensing device in FIG. 3B may receive the correction matrix 124 from the computing device 310 or from file 330.

The system 350 may include host software 360. The host software 360 may be executed on a computing device (e.g., electronic device 110, vehicle computer 130, a device external to the sensing device 120, etc.) that communicates with the sensing device 120 via an interconnect 340 by using a communication protocol (e.g., integrated circuit protocol (I²C), serial peripheral interface (SPI)). The sensing device 120 may receive signals from the touch array 142 and may convert the signals into measurement values 126. The sensing device 120 may access a correction matrix 124 (e.g., stored in memory 122) that defines an active region and an inactive region of the touch array 142 (e.g., a non-rectangular touch array). The sensing device 120 may modify the measurement values 126 (e.g., raw count, measured digitalized sensor capacitance, etc.) corresponding to a subset of unit cells 144 that are partially within the active region defined by correction values of the correction matrix 124 (e.g., multiply the raw count by gain correctors).

FIGS. 4A-D illustrate exemplary non-rectangular touch arrays 400 according to various embodiments. In one embodiment, the touch array 400a is a circular touch array. In another embodiment, the touch array 400b has opposing sides that are not parallel to each other. For example, the touch array 400b may be a trapezoid. In another embodiment, touch array 400c has a rounded side (e.g., is a semicircle). In another embodiment, touch array 400d has one or more holes (e.g., the active region surrounds one or more inactive regions). A sensing device 120 (e.g., touch controller) may process signals received from any of touch array 400a-d by using a corresponding correction matrix 124 to generate measurement values 126.

Figure 5:
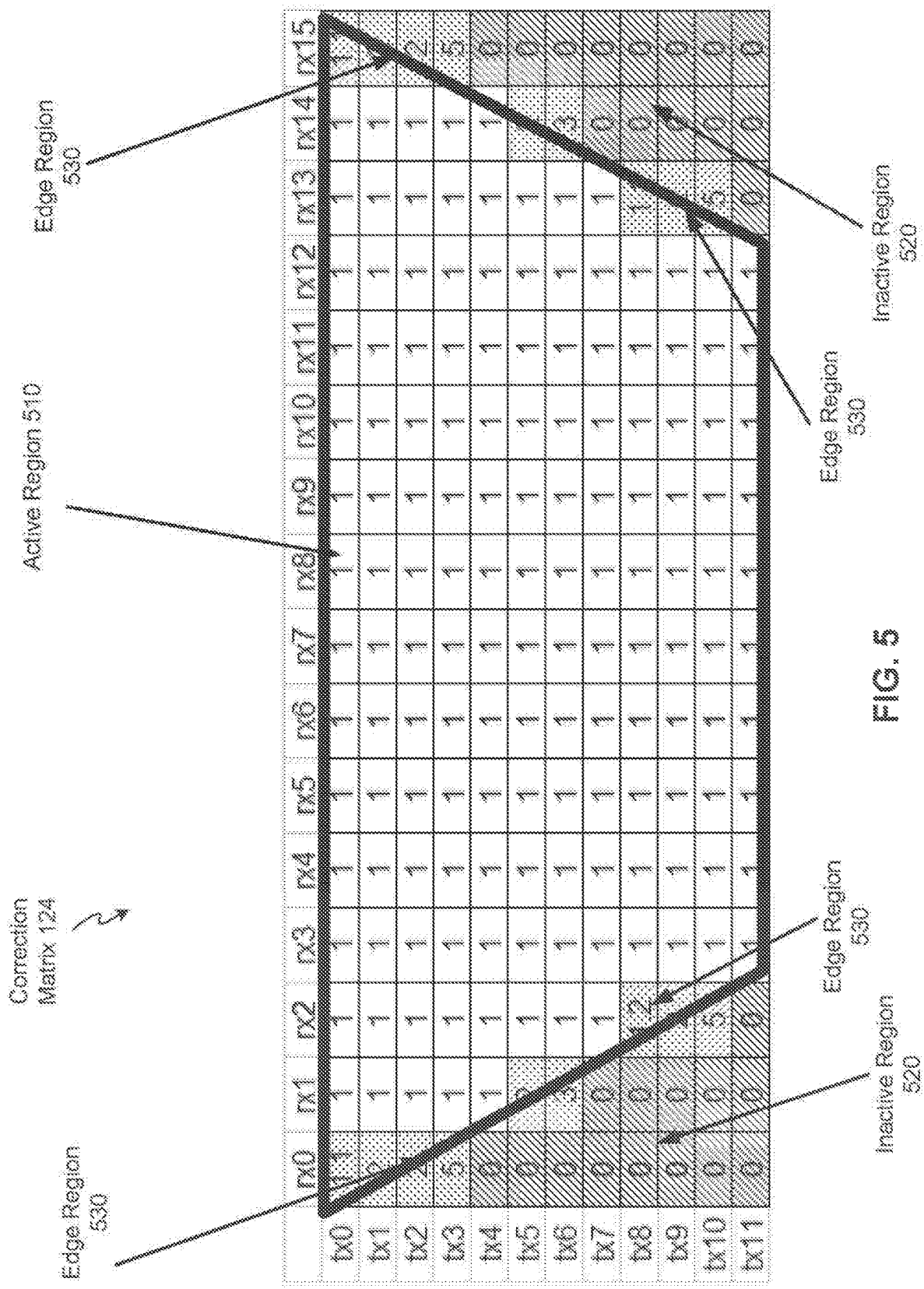
FIG. 5 illustrates a correction matrix for modifying values corresponding to unit cells of a touch array of a touch panel, according to another embodiment.

FIG. 5 illustrates a correction matrix 124 for modifying values 126 corresponding to unit cells 144 of a touch array 142 of a touch panel 140, according to another embodiment. The correction matrix 124 may define an active region 510, an inactive region 520, and an edge region 530.

The correction matrix 124 may define an edge region 530. The processing element 128 may provide unity-gain functionality for the active region 510 via a unity-gain correction value, a masking functionality for the inactive region 520 via a masking correction value, and gain functionality for the edge region 530 via the non-unity gain correction value.

An area of the correction matrix 124 may correspond to a larger area than the active region 510 of the touch array 142. The touch panel 140 corresponding to the touch array 142 may be a free-form panel (e.g., non-rectangular, hole-containing). The sensing device 120 may be a rectangular-organized touch controller and the correction matrix 124 may be a rectangular matrix that corresponds to the rectangular-organized touch controller.

In FIG. 5, columns rx0-rx15 may represent receiving electrodes (e.g., column electrodes 215 of FIG. 2A) and rows tx0-tx11 may represent transmitting electrodes (e.g., row electrodes 211 of FIG. 2A). The correction matrix 124 may have a matrix dimension that is RX*TX, where RX is the number of receiving electrodes connected to a touch array 142 (e.g., a non-rectangular touch array, a touch array that contains holes, etc.) and TX is the number of transmitting (e.g., excitation) electrodes connected to the touch array 142. The intersection of a receiving electrode and a transmitting electrode (a RX*TX intersection) has a corresponding element (e.g., a correction value) in the correction matrix 124. Correction values that correspond to unit cells 144 that are completely within the active region 510 may have a value of one (e.g., a unity-gain correction). Correction values that do not correspond to unit cells 144 (e.g., that correspond to a hole in a touch array 142, that correspond to an area outside of the touch array 142, etc.) may have a value of zero (e.g., a masking correction). Correction values that correspond to unit cells 144 that are partially within the active region 510 have a value that is not zero or one (e.g., non-unity gain correction). Gain correctors may improve unit cell 144 uniformity on the edge of the active region 510. For example, if only half of the unit cell 144 is within the active region 510, the gain corrector may have a value of two. In another example, if only one fifth of a unit cell 144 is within the active region 510, the gain corrector may have a value of five.

The correction values of the correction matrix 124 may be used according to the equation: $S_{newi}=S_{mi}*M_i$, where i is a number that identifies the unit cell 144, $S_{newi}$ is the corrected measurement value, $S_{mi}$ is the measurement value 126, and $M_i$ is the value of the correction value. In some embodiments, the correction values of the correction matrix 124 may be used in addition to other adjustment values. Other adjustment values may include adjustment values based on the distance of a unit cell 144 from a connection of the touch array 142 (e.g., a connection that couples the touch array 142 to sensing device 120).

Figure 6:
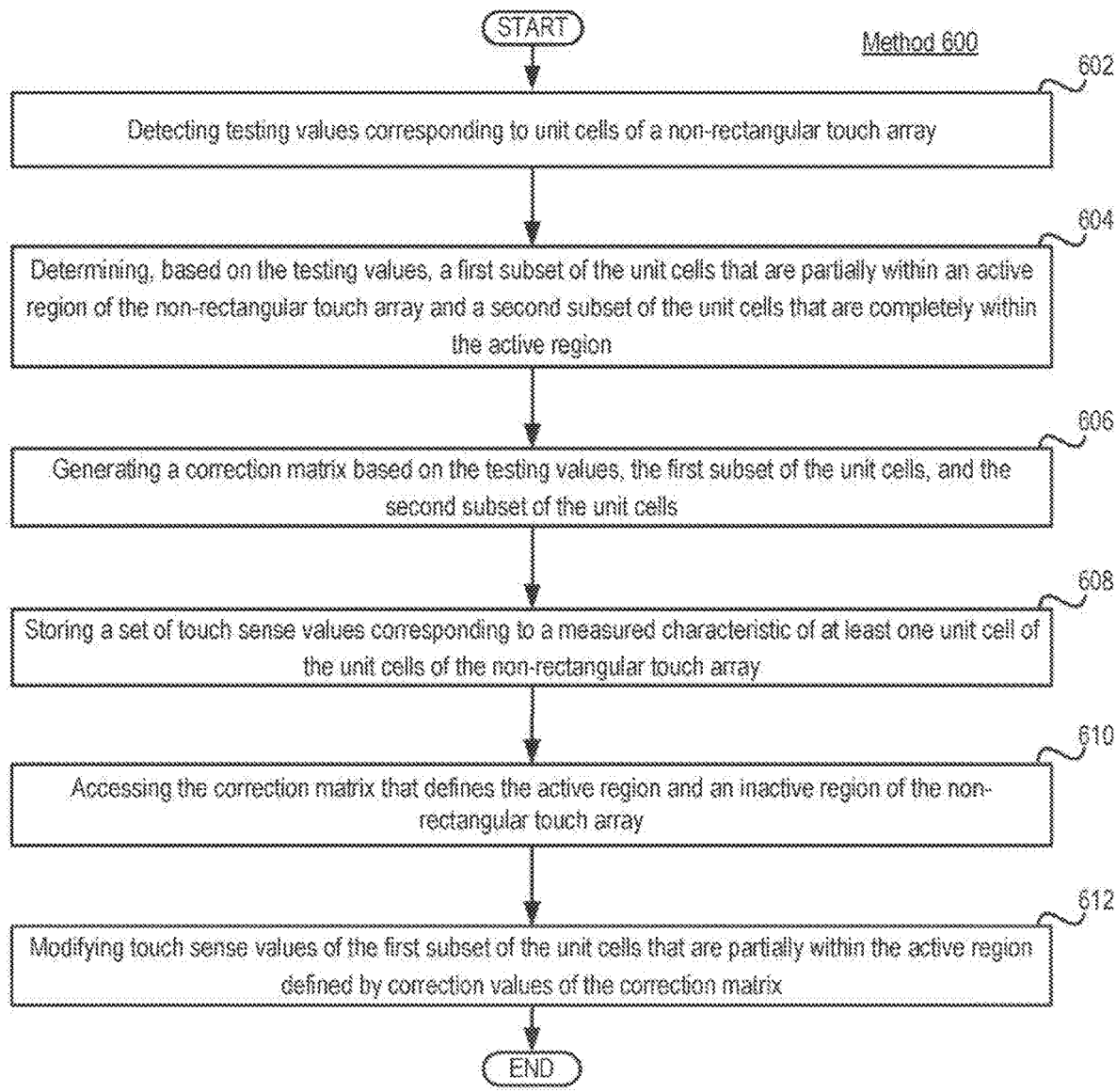
FIG. 6 is a flow diagram illustrating an example method of modifying values corresponding to unit cells of a touch array, according to one embodiment.

FIG. 6 is a flow diagram illustrating an example method 600 of modifying values 126 corresponding to unit cells 144 of a touch array 142, according to one embodiment.

Method 600 may be performed by processing logic that may include hardware (e.g., circuitry, dedicated logic), software (such as is run on a general purpose computer system or a dedicated machine), or a combination of both. Method 600 and each of its individual functions, routines, subroutines, or operations may be performed by one or more processing elements as described herein. In certain embodiments, method 600 may be performed by a single processing thread. Alternatively, method 600 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. For example, a non-transitory machine-readable storage medium may store instructions which, when executed, cause a processing device (e.g., of a sensing device 120, etc.) to perform operations including methods disclosed within.

Referring to FIG. 6, method 600 may be performed by processing logic of one or more processing devices of electronic device 110 (e.g., sensing device 120, processing element 128, etc.) for modifying values 126 corresponding to unit cells 144 of a touch array 142.

Method 600 may begin at block 602 where the processing logic may detect testing values corresponding to unit cells 144 of a touch array 142 (e.g., testing touch sense values corresponding to a measured characteristic of at least one unit cell of unit cells of a non-rectangular touch array). Generating of the testing values may include the touch array 142 measuring a change in a value (e.g., capacitance, resistance, etc.) in response to an object coming in contact or close proximity with the touch panel 140 (e.g., each unit cell 144 of the touch panel 140). The sensing device 120 may detect the change in value from the touch array 142. In one embodiment, the detecting of the testing values includes the processing logic generating the testing values. In another embodiment, the detecting of the testing values includes receiving the testing values from an external device that generated the testing values.

At block 604, the processing logic may determine, based on the testing values, a first subset of the unit cells 144 that are completely within an active region 510 of the touch array 142 and a second subset of the unit cells 144 that are partially within the active region 510 (e.g., unit cells in the edge region 530).

At block 606, the processing logic may generate a correction matrix 124 (e.g., a touchscreen sensor matrix array) based on the testing values, the first subset of the unit cells 144, and the second subset of the unit cells 144. The processing logic may generate the correction matrix 124 by assigning unitary gain correctors to a first subset of the elements that are completely within the active region 510, assigning masking correctors to a second subset of the elements that are completely within the inactive region 520, and assigning gain correctors to a third subset of the elements that are within an edge region 530. Each unit cell of the third subset may be partially within the active region 510 and partially within the inactive region 520. In one implementation, the processing logic generates the correction matrix 124 (e.g., a new correction matrix is created, an existing correction matrix is updated) as part of manufacturing of the touch panel 140 (e.g., and electronic device 110). In another implementation, the processing logic generates the correction matrix 124 as part of testing of the touch panel 140 (e.g., and electronic device 110). In another implementation, the processing logic generates the correction matrix 124 upon initiating (e.g., turning on, powering-up) the touch panel 140 (e.g., and electronic device 110). In another implementation, the processing logic generates the correction matrix 124 at intervals (e.g., during use of the electronic device 110 and touch panel 140). In another implementation, the processing logic generates the correction matrix 124 upon switching modes (e.g., switching between a finger-touch mode, a stylus mode, etc.) via the electronic device 110. In another implementation, the processing logic generates the correction matrix 124 upon receiving instructions from the electronic device 110 (e.g., via the sensing device 120, vehicle computer 130). In another implementation, a correction matrix 124 is generated upon receiving instructions from a host computing device. In another implementation, the correction matrix 124 is a constant for a touch panel 140 (e.g., the correction matrix 124 is generated during testing and manufacturing for subsequent use as constant values for the touch panel 140 and electronic device 110).

At block 608, the processing logic may store a set of measurement values 126 corresponding to the unit cells 144 of the non-rectangular touch array 142. For example, the processing logic may receive signals from the touch array 142 and the processing logic may convert the signals into a set of measurement values 126 including a change in a value (e.g., capacitance, resistance, etc.) in response to an object coming in contact or close proximity with the touch panel 140.

At block 610, the processing logic may access the correction matrix 124 that defines the active region 510 and an inactive region 520 of the touch array 142. The processing element 128 may have stored the correction matrix 124 in memory 122 in response to block 606.

At block 612, the processing logic may modify values 126 corresponding to a subset of the unit cells 144 that are partially within the active region 510 defined by correction values of the correction matrix 124. For example, the processing logic may multiply each of the measurement values 126 by a corresponding correction value of the correction matrix 124.

Figure 7:
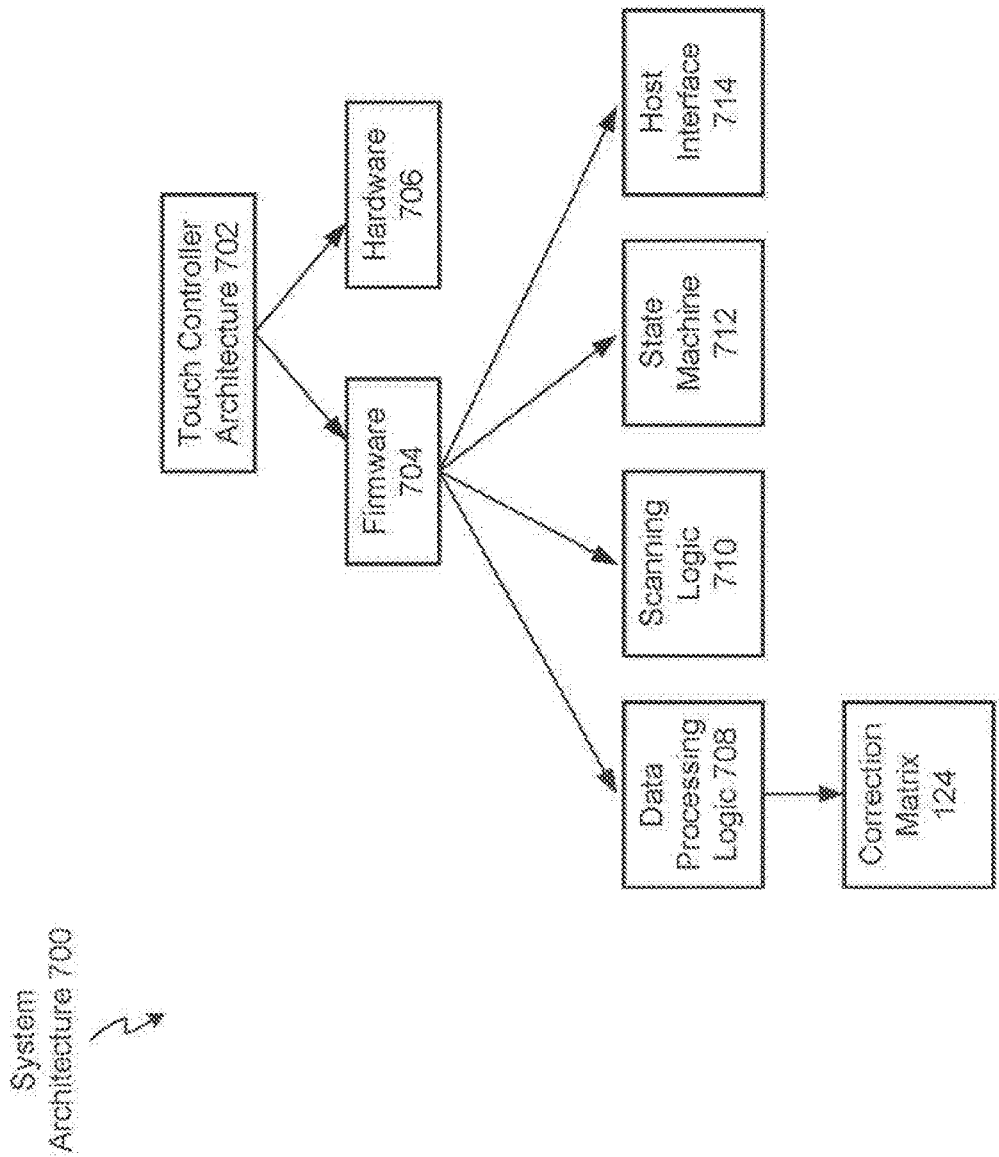
FIG. 7 is a block diagram illustrating an exemplary system architecture including a correction matrix for modifying values corresponding to unit cells of a touch array of a touch panel, according to another embodiment.

FIG. 7 is a block diagram illustrating an exemplary system architecture 700 including a correction matrix 124 for modifying values corresponding to unit cells 144 of a touch array 142 of a touch panel 140, according to another embodiment. The sensing device 120 (e.g., touch controller, processing element 128) may have a touch controller architecture 702. The touch controller architecture 702 may include firmware 704 and hardware 706. The firmware 704 may include data processing logic 708, scanning logic 710, a state machine 712, and a host interface 714. The data processing logic 708 may include the correction matrix 124.

The particular features, structures or characteristics described herein may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method comprising:
    accessing a correction value in a correction matrix, the correction matrix defining an active region of a touch array, the touch array comprising a plurality of unit cells, wherein the correction value corresponds to a unit cell of the plurality of unit cells; and
    modifying a touch sense value of the unit cell using the correction value, based on the unit cell being partially within the active region, wherein the modifying of the touch sense value is based on the unit cell being partially within an inactive region of the touch array, the correction matrix defining the inactive region; and
    detecting an object using the touch array, based on the modified sense value.

2. The method of claim 1, wherein the modifying of the sense value comprises using a gain value that is based on a proportion of the unit cell that is within the active region.

3. The method of claim 1, wherein the modifying of the touch sense value using the correction value comprises modifying the touch sense value using a non-unity gain correction value.

4. The method of claim 1, wherein the modifying of the touch sense value using the correction value comprises modifying the touch sense value using a masking correction value.

5. The method of claim 1, wherein the modifying of the touch sense value comprises modifying the touch sense value based on the unit cell being on an edge of the active region.

6. The method of claim 1, wherein the modifying of the touch sense value comprises modifying the touch sense value based on the unit cell being partially within a hole of the touch array.

7. The method of claim 6, wherein the hole comprises an opening in a surface of touch panel comprising the touch array.

8. The method of claim 1, further comprising detecting user input to a touch panel of a vehicle, based on the detecting of the object.

9. A system comprising:
    a vehicle touch panel comprising a plurality of discrete sensors;
    a processor coupled to the vehicle touch panel; and
    a memory configured to store a correction matrix that defines an active region of the plurality of discrete sensors and an inactive region of the plurality of discrete sensors, wherein the processor is configured to: access, in the memory, a correction value of the correction matrix that corresponds to a discrete sensor of the plurality of discrete sensors, and generate a modified sense value of the discrete sensor using the correction value, based on the discrete sensor being partially within the active region and partially within the inactive region, wherein the discrete sensor of the plurality of discrete sensors is on an edge of the active region.

10. The system of claim 9, wherein the inactive region comprises an opening in a surface of the vehicle touch panel.

11. The system of claim 9, wherein the processor is configured to use a gain value to generate the modified sense value, wherein the gain value is based on a proportion of the discrete sensor that is within the active region.

12. The system of claim 9, wherein the processor is configured to use a non-unity gain correction value to generate the modified sense value.

13. The system of claim 9, wherein the processor is configured to use a masking correction value to generate the modified sense value.

14. The system of claim 9, wherein the vehicle touch panel comprises a sensor array comprising the plurality of discrete sensors.

15. The system of claim 14, wherein the sensor array comprises a plurality of unit cells, wherein each discrete sensor, of the plurality of discrete sensors, corresponds to a different unit cell, of the plurality of unit cells.

16. The system of claim 9, wherein the inactive region is adjacent to a first edge of the active region, wherein the correction matrix defines another inactive region of the plurality of discrete sensors, wherein the other active region is adjacent to a second edge of the active region, wherein the inactive region and the other inactive region are separated by the active region.

17. The system of claim 16, wherein active regions comprises a rounded edge.

18. The system of claim 17, wherein the active region comprises a trapezoidal shape and at least one of the inactive region and the other inactive region comprises a triangular shape.

19. A method comprising:
    accessing a correction value in a correction matrix, the correction matrix defining an active region of a touch array, the touch array comprising a plurality of unit cells, wherein the correction value corresponds to a unit cell of the plurality of unit cells; and modifying a touch sense value of the unit cell using the correction value, based on the unit cell being partially within the active region;
detecting an object using the touch array, based on the modified sense value; and
detecting user input to a touch panel of a vehicle, based on the detecting of the object.

\* \* \* \* \*